US010002020B2

(12) United States Patent
Horsnell et al.

(10) Patent No.: US 10,002,020 B2
(45) Date of Patent: Jun. 19, 2018

(54) CALL STACK MAINTENANCE FOR A TRANSACTIONAL DATA PROCESSING EXECUTION MODE (71) Applicant: ARM LIMITED, Cambridge (GB)

(72) Inventors: Matthew James Horsnell, Cambridge (GB); Stephan Diestelhorst, Cambridge (GB)

(73) Assignee: ARM Limited, Cambridge (GB)

( * ) Notice: Subject to any disclaimer, the term of this patent is extended or adjusted under 35 U.S.C. 154(b) by 0 days. days.

(21) Appl. No.: 15/325,301

(22) PCT Filed: Jun. 9, 2015

(86) PCT No.: PCT/GB2015/051675
§ 371 (c)(1),
(2) Date: Jan. 10, 2017

(87) PCT Pub. No.: WO2016/009168
PCT Pub. Date: Jan. 21, 2016

(65) Prior Publication Data
US 2017/0161095 A1 Jun. 8, 2017

(30) Foreign Application Priority Data
Jul. 15, 2014 (GB) .................................. 1412534.8

(51) Int. Cl.
G06F 9/46 (2006.01)
G06F 12/128 (2016.01)
(Continued)

(52) U.S. Cl.
CPC .............. *G06F 9/467* (2013.01); *G06F 9/528* (2013.01); *G06F 12/0875* (2013.01);
(Continued)

(58) Field of Classification Search
None
See application file for complete search history.

(56) References Cited

U.S. PATENT DOCUMENTS

2008/0016325 A1* 1/2008 Laudon ................. G06F 9/3012
712/217
2008/0288819 A1 11/2008 Heller
(Continued)

OTHER PUBLICATIONS

International Search Report and Written Opinion of the ISA for PCT/GB2015/051675, dated Sep. 4, 2015, 14 pages.
(Continued)

Primary Examiner — Kaushikkumar Patel
(74) Attorney, Agent, or Firm — Nixon & Vanderhye P.C.

(57) ABSTRACT

A data processing apparatus and method of data processing are provided, which relate to the operation of a processor which maintains a call stack in dependence on the data processing instructions executed. The processor is configured to operate in a transactional execution mode when the data processing instructions seek access to a stored data item which is shared with a further processor. When the processor enters its transactional execution mode it stores a copy of the current stack depth indication and thereafter, when operating in its transactional execution mode, further modifications to the call stack are compared to the copy of the stack depth indication stored. If the relative stacking position of the required modification is in a positive stack growth direction with respect to the copy stored, the modification to the call stack is labelled as non-speculative. Conversely if the modification to the call stack is to be made at a relative stacking position which is not in a positive growth direction with respect to the position indicated by the copy stored, then that modification is labelled as speculative. The size of the write-set associated with maintaining the call stack while in transactional execution mode can therefore be reduced.

13 Claims, 7 Drawing Sheets (51) Int. Cl.
    *G06F 9/52*          (2006.01)
    *G06F 12/0875*    (2016.01)
    *G06F 12/0891*    (2016.01)
    *G06F 12/0811*    (2016.01)

(52) U.S. Cl.
    CPC ........ *G06F 12/0891* (2013.01); *G06F 12/128* (2013.01); *G06F 12/0811* (2013.01); *G06F 2212/1032* (2013.01); *G06F 2212/451* (2013.01); *G06F 2212/621* (2013.01)

(56) References Cited

U.S. PATENT DOCUMENTS

| | | |
|---|---|---|
| 2010/0023703 A1 | 1/2010 | Christie et al. |
| 2011/0093684 A1* | 4/2011 | Tene .................... G06F 9/3001 |
| | | 712/216 |
| 2011/0307689 A1 | 12/2011 | Chung et al. |
| 2013/0151791 A1 | 6/2013 | Diestelhorst et al. |

OTHER PUBLICATIONS

Search Report for GB 1412534.8, dated Jan. 28, 2015, 3 pages.
Jacobi et al., "Transactional Memory Architecture and Implementation for IBM System Z", 2014 47$^{th}$ Annual IEEE/ACM International Symposium on Microarchitecture, Dec. 2012, pp. 25-36.
Chung et al., "ASF: AMD64 Extension for Lock-free Data Structures and Transactional Memory", Mircoarchitecture (MICRO), 2010 43$^{rd}$ Annual IEEE/ACM International Symposium, Dec. 4, 2010, pp. 39-50.

\* cited by examiner

CALL STACK MAINTENANCE FOR A TRANSACTIONAL DATA PROCESSING EXECUTION MODE

This application is the U.S. national phase of International Application No. PCT/GB2015/051675 filed 9 Jun. 2015, which designated the U.S. and claims priority to GB Patent Application No. 1412534.8 filed 15 Jul. 2014, the entire contents of each of which are hereby incorporated by reference.

TECHNICAL FIELD

The present disclosure relates to data processing. More particularly, it relates to the maintenance of a call stack data structure used when data processing in a transactional execution mode.

BACKGROUND

A data processor may be configured to maintain a call stack in dependence on the data processing instructions it executes, in particular where the data processor pushes a return address onto the call stack when a function call is encountered, and to pop that return address from the call stack when the function ends. In a contemporary data processing apparatus it is common for more than one data processor (e.g. processor core) to be provided due to the performance enhancement that this brings. However, certain constraints with regard to the data processing carried out by these multiple processors must then be respected, to ensure that the results of the data processing performed by the multiple processors are predictable and determinate. One such example of this concerns transactional execution by a data processor, when accessing a data structure (e.g. stored in system memory) wherein that data structure is shared with at least one other data processor in the system. The sharing of this data structure means that certain protocols must be followed in order to avoid data hazards due to different data processors making concurrent modifications to the shared data structure. Each data processor in the data processing apparatus may then be configured, when operating in a transactional execution mode (i.e. during a period when access to a shared data structure is being attempted, but has not yet successfully completed) to update the call stack in a speculative manner, so that if the transactional execution with respect to the shared data structure does not successfully complete, then the data processor can discard the speculative modifications and "roll back" to the last known non-speculative point in the data processing sequence.

SUMMARY

In accordance with a first example configuration there is provided an apparatus comprising processor circuitry configured to execute data processing instructions, wherein the processor circuitry is configured to maintain a call stack data structure in dependence on the data processing instructions it executes, and wherein the processor circuitry is configured to operate in a transactional execution mode when the data processing instructions executed access stored data items shared with further processor circuitry; and pre-transactional stack pointer storage circuitry configured to store a stack depth indication for the call stack data structure, wherein the processor circuitry is configured to store the stack depth indication prior to entering the transactional execution mode, wherein the processor circuitry is configured, when operating in the transactional execution mode, to determine a relative stacking position for a modification to the call stack data structure with respect to the stack depth indication, and if the relative stacking position is in a positive stack growth direction with respect to a position indicated by the stack depth indication, to store in association with the modification an indication that the modification is non-speculative, and if the relative stacking position not in a positive stack growth direction with respect to the position indicated by the stack depth indication, to store in association with the modification an indication that the modification is speculative.

In accordance with another example configuration there is provided an apparatus comprising means for means for executing data processing instructions; means for maintaining a call stack data structure in dependence on the data processing instructions executed, wherein the means for executing data processing instructions is configured to operate in a transactional execution mode when the data processing instructions executed access stored data items shared with further means for executing data processing instructions; means for storing a stack depth indication for the call stack data structure, wherein the stack depth indication is stored prior to the means for executing data processing instructions entering the transactional execution mode; means for determining, when operating in the transactional execution mode, a relative stacking position for a modification to the call stack data structure with respect to the stack depth indication; and means for storing an indication in association with the modification, wherein if the relative stacking position is in a positive stack growth direction with respect to a position indicated by the stack depth indication, the indication shows that the modification is non-speculative, and if the relative stacking position is not in a positive stack growth direction with respect to the position indicated by the stack depth indication the indication shows that the modification is speculative.

In accordance with another example configuration there is provided a method of data processing in a processor device comprising executing data processing instructions; maintaining a call stack data structure in dependence on the data processing instructions executed; entering a transactional execution mode when the data processing instructions executed will seek access to stored data items shared with a further processor device; storing a stack depth indication, wherein the stack depth indication is stored prior to entering the transactional execution mode; determining, when operating in the transactional execution mode, a relative stacking position for a modification to the call stack data structure with respect to the stack depth indicator; and if the relative stacking position is in a positive stack growth direction with respect a position indicated by the stack depth indication, storing in association with the modification an indication that the modification is non-speculative, and if the relative stacking position is not in a positive stack growth direction with respect to the position indicated by the stack depth indication, storing in association with the modification an indication that the modification is speculative.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

In accordance with a first example configuration there is provided an apparatus comprising processor circuitry configured to execute data processing instructions, wherein the processor circuitry is configured to maintain a call stack data structure in dependence on the data processing instructions it executes, and wherein the processor circuitry is configured to operate in a transactional execution mode when the data processing instructions executed access stored data items shared with further processor circuitry; and pre-transactional stack pointer storage circuitry configured to store a stack depth indication for the call stack data structure, wherein the processor circuitry is configured to store the stack depth indication prior to entering the transactional execution mode, wherein the processor circuitry is configured, when operating in the transactional execution mode, to determine a relative stacking position for a modification to the call stack data structure with respect to the stack depth indication, and if the relative stacking position is in a positive stack growth direction with respect to a position indicated by the stack depth indication, to store in association with the modification an indication that the modification is non-speculative, and if the relative stacking position not in a positive stack growth direction with respect to the position indicated by the stack depth indication, to store in association with the modification an indication that the modification is speculative.

The inventors of the present techniques have realised that although a configuration in which modifications to a call stack whilst a processor is operating in transactional execution mode are marked as speculative is safe, in the sense that this will certainly allow the processor to "roll back" the state of the call stack to the configuration it had when the processor entered the transactional execution mode in the event that the transaction attempted does not successfully complete, the resulting size of the data set which the data processor must maintain with respect to the speculative modifications to the call stack can be undesirably large. The present techniques address this issue and provide that the size of this data set may be reduced.

Accordingly, pre-transactional stack pointer storage circuitry is provided which can store an indication of the stack depth pointed to by a stack pointer used by the processor in its administration and maintenance of the call stack, this stack depth indication being stored to the pre-transactional stack pointer storage circuitry prior to the processor entering its transactional execution mode. Note that entering the transactional execution mode may for example result from the processor recognising the need to do so based on the identification of a stored data item to be accessed being one that is shared with further processor circuitry or in another example may result from execution of an explicit "begin transactional execution mode" instruction which switches the processor into transactional execution mode. In the context of the latter example an "end transactional execution mode" instruction may also then later be used to switches the processor out of transactional execution mode.

Furthermore, the processor then, for each modification which it makes thereafter (whilst in transactional execution mode) to the call stack, determines where that modification will occur with respect to the indication stored in the pre-transactional stack point storage. This relative stacking position for the modification is in particular determined with respect to the stack growth direction of the call stack, where it will be understood that this stack growth might be described as "upwards" or "downwards" in dependence on the particular configuration of the call stack, whether the call stack grows towards increasing or decreasing memory addresses, and so on. Then, when making the modification to the call stack, the processor determines if the relative stacking position of the modification is in a positive stack growth direction with respect to the position indicated by the content of the pre-transactional stack pointer storage. If the modification is found to be required to a relative stacking position which is in a positive stack growth direction, then an indication is stored in association with the modification to the call stack which indicates that this modification is non-speculative. Conversely if it is determined that the relative stacking position of the modification is not in a positive growth direction with respect to the position indicated by the content of the pre-transactional stack pointer storage, then the indication stored in association with the modification to the call stack is set to indicate that the modification is speculative. It will be understood that these speculative/non-speculative indications stored in association with modifications may for example merely comprise bit either being set or not set.

The size of the data set which the processor must then maintain in association with the call stack in order to correctly administer the speculative nature of some modifications to the call stack when in transactional execution mode may therefore be reduced, because a subset of those modifications are not in fact labelled as speculative, but are labelled as non speculative in the manner that such modifications would be made when the processor is not in transactional execution mode (and not otherwise performing some kind of speculative execution). This is possible based on the realisation that in the event that the transaction being attempted in the transactional execution mode does not successfully complete, then if the processor handles this by rolling back the state of the call stack to that which it had when the processor entered its transactional execution mode, and in particular resets the stack pointer to the value that it had at that stage of data processing, then modifications to the call stack which had been made in the transactional execution mode at positions in a positive stack growth direction with respect to that stack depth at transactional execution mode entry can simply be discarded, because they did not have the potential to overwrite any call stack content written at or previous to that point of entry into the transactional execution mode.

The pre-transactional stack point storage circuitry may be configured in a variety of ways, but in one embodiment the pre-transactional stack pointer storage circuitry is configured to store a copy of a stack pointer used by the processing circuitry for the call stack data structure. Thus for example, where the current stack pointer is stored by the apparatus in a register of the processor, the content of that register can be copied into the pre-transactional stack pointer storage circuitry. Indeed, in some embodiments the pre-transactional stack pointer storage circuitry itself comprises a register accessible to the processing circuitry. Such a register may in addition be configured to be inaccessible to data processing instructions executed by the processing circuitry. In other words, this register may be transparent to the programmer, such that its content may not be modified by an external agent.

Modifications to the call stack may include pushes and pops. In some embodiments if the relative stacking position is not in the positive stack growth direction with respect to the position indicated by the stack depth indication, and the modification is a push to the call stack data structure, a data item pushed onto the call stack data structure by the push is marked as speculatively written. Thus a data item or data items stored by the apparatus to reflect the result of the push operation are thus marked as having being speculatively written. Conversely, if the relative stacking position is not in a positive stack growth direction with respect to the position indicated by the stack depth indication, and the modification is a pop from the call stack data structure, a data item popped from the call stack data structure by the pop is marked as speculatively read. Hence, a data item or data items previously stored by the apparatus to reflect the addition of the call stack content which the pop is now seeking to remove from the call stack is/are updated to indicate that it/they have been speculatively read. It should further be noted that where the call stack is only accessible to the processor circuitry to which it belongs (and not to the further processor circuitry) then such marking as speculatively read is typically redundant, since a speculative read of this data item or these data items cannot affect the further processing circuitry in terms of any coherency mechanism provided.

The processor circuitry may be configured to maintain the call stack data structure in a variety of storage location. For example, the processor circuitry may maintain the call stack data structure in a memory in which the data items which are shared with the further processor circuitry are stored. However, in some embodiments the apparatus further comprises storage circuitry configured to store local copies of data items accessed by the processor circuitry in memory when executing the data processing instructions, wherein the processor circuitry is configured to maintain the call stack data structure in the storage circuitry. This storage circuitry is configured to store local copies of data items accessed by the processor circuitry in memory, i.e. in other words is typically a cache, and will typically be configured to have a considerably smaller storage capacity. The present techniques may find particular applicability in the context of an apparatus comprising processor circuitry and an associated local cache, due to the relatively limited storage capacity which such a cache may have.

When the apparatus comprises such storage circuitry, the storage circuitry may comprise a coherency control unit, the coherency control unit configured to allow content of the storage circuitry indicated as non-speculative to be evicted to the memory and to generate an error condition if content of the storage circuitry is selected for eviction and is indicated as speculative. The coherency control unit thus administers the determination of what content should be held in the storage circuitry at any given stage of data processing, in particular in view of the fact that the storage circuitry (such as a cache) may have relatively limited storage capacity. Thus, the coherency control unit can allow content of the storage circuitry indicated as not speculative to be evicted to memory (typically when new content is required to be stored in the storage circuitry) which (due to the storage circuitry configuration) is required to be stored in a predetermined location where valid content is already stored. If this pre-existing valid content is marked as non-speculative then the coherency control unit allows such an eviction to go ahead, whereas if it is marked as speculative the coherency control unit generates an error condition. In the context of the processor operating in transactional execution mode this will typically represent a development which prevents the processor circuitry from continuing with the attempted transaction, since it cannot be guaranteed that further speculative modifications to the call stack can be stored in the storage circuitry, and the error condition generated may then result in the transaction attempt aborting.

If however the transaction attempted in the transactional execution mode completes successfully then speculative content of the storage circuitry can be updated to be non-speculative, since the corresponding changes represent definitive changes which have successfully taken place. Accordingly, in one embodiment the coherency control unit is configured, when the processing circuitry exits the transactional execution mode and the data processing instructions executed in the transaction execution mode have successfully completed their data processing operations, to change content of the storage circuitry indicated as speculative to indicated as non-speculative.

The coherency control unit may be configured to hide content of the storage circuitry indicated as speculative from the further processor circuitry. This provides that any coherency mechanism provided in the apparatus does not need to further ensure that any speculative content of the storage circuitry is safely handled with regard to the further processing circuitry. For example, the coherency control unit may be configured, if the further processing circuitry indicates that it is accessing corresponding content, to respond with a notification that such content is not currently stored in the storage circuitry.

In some embodiments the apparatus further comprises abort handling circuitry, the abort handling circuitry configured, when the processing circuitry is operating in the transactional execution mode, to perform a rollback procedure in response to an indication that a pending transaction has failed, wherein the rollback procedure comprises discarding any modifications indicated as speculative and resetting a current stack pointer using the stored stack depth indication. As such, if the processing circuitry does not successfully exit the transactional execution mode, and the transaction that was attempted must be attempted again, then the data processing being carried out by the processing circuitry can be rolled back (reset) to the point at which the transactional execution mode was started and hence the current stack pointer being used by the processing circuitry to reference the call stack is reset to the value of the stored stack depth indication, i.e. the value that the stack pointer had when the transactional execution mode was entered.

In accordance with another example configuration there is provided an apparatus comprising means for means for executing data processing instructions; means for maintaining a call stack data structure in dependence on the data processing instructions executed, wherein the means for executing data processing instructions is configured to operate in a transactional execution mode when the data processing instructions executed access stored data items shared with further means for executing data processing instructions; means for storing a stack depth indication for the call stack data structure, wherein the stack depth indication is stored prior to the means for executing data processing instructions entering the transactional execution mode; means for determining, when operating in the transactional execution mode, a relative stacking position for a modification to the call stack data structure with respect to the stack depth indication; and means for storing an indication in association with the modification, wherein if the relative stacking position is in a positive stack growth direction with respect to a position indicated by the stack depth indication, the indication shows that the modification is non-speculative, and if the relative stacking position is not in a positive stack growth direction with respect to the position indicated by the stack depth indication the indication shows that the modification is speculative.

In accordance with another example configuration there is provided a method of data processing in a processor device comprising executing data processing instructions; maintaining a call stack data structure in dependence on the data processing instructions executed; entering a transactional execution mode when the data processing instructions executed will seek access to stored data items shared with a further processor device; storing a stack depth indication, wherein the stack depth indication is stored prior to entering the transactional execution mode; determining, when operating in the transactional execution mode, a relative stacking position for a modification to the call stack data structure with respect to the stack depth indicator; and if the relative stacking position is in a positive stack growth direction with respect a position indicated by the stack depth indication, storing in association with the modification an indication that the modification is non-speculative, and if the relative stacking position is not in a positive stack growth direction with respect to the position indicated by the stack depth indication, storing in association with the modification an indication that the modification is speculative.

Figure 1:
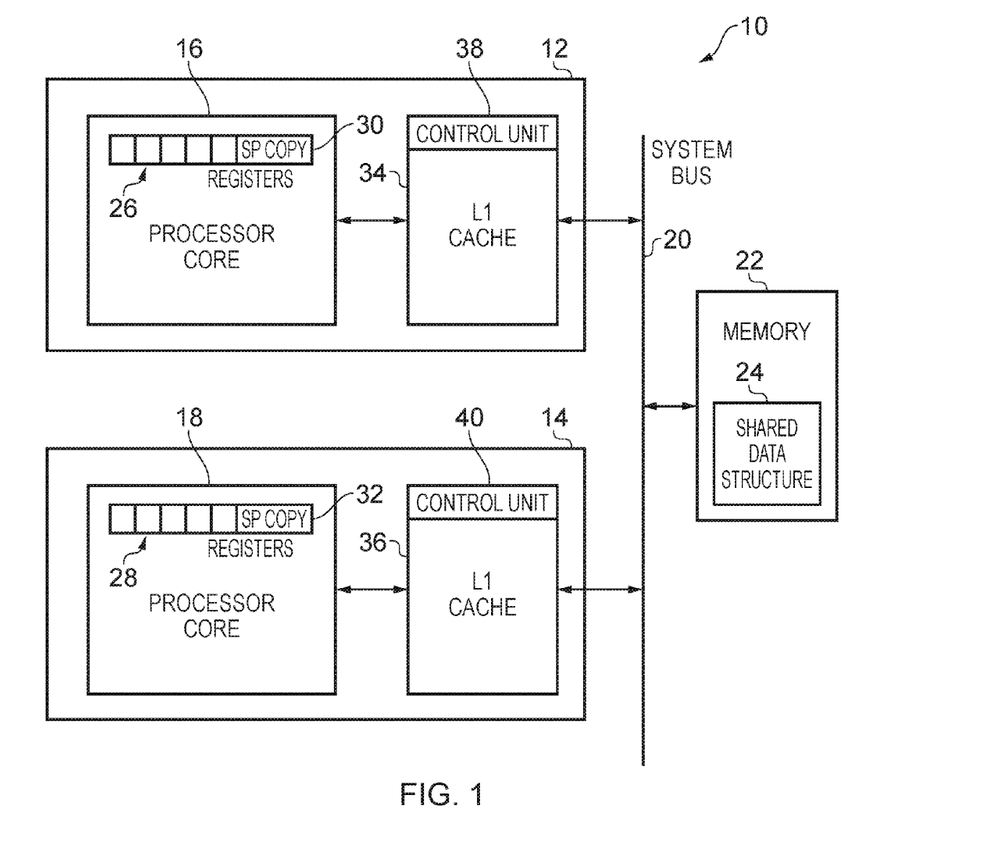
FIG. 1 schematically illustrates a data processing apparatus in one embodiment, showing two processor cores which can each access a shared data structure in memory.

FIG. 1 schematically illustrates a data processing system 10 which comprises two data processing apparatuses 12 and 14 according to one embodiment. Each data processing apparatus 12,14 comprises a processor core 16,18 respectively and accordingly it will be recognised that the data processing system 10 is a multi-core system. Each data processing apparatus 12,14 accesses the same system bus 20 via which it can access (amongst other targets) a memory 22. Although both processing apparatuses 12 and 14 have access to the same memory 22 there may be regions of the memory 22 to which only one of the data processing apparatuses has access and the other data processing apparatus is prevented from accessing (or at least perhaps prevented from modifying) in accordance with known memory allocation and control techniques. However, as illustrated the memory 22 contains at least one region in which a shared data structure 24 is stored, to which both data processing apparatuses 12 and 14 have access. This shared data structure 24 could for example be a database, but the present techniques are in no way limited to such an example. The shared data structure 24 could represent a much simpler data structure, indeed in principle even only a single data item accessible to both data processing apparatuses.

The fact that both data processing apparatuses 12 and 14 have access to the same shared data structure 24 in memory 22 imposes certain constraints on the manner in which the data processing apparatuses operate, in order to ensure that conflicts do not arise when both data processing apparatuses, in particular their respective processor cores, seek to access the same shared data structure 24 (and in the context of the above-mentioned shared database, for example the same data item within that shared database). To avoid such conflict, each processor core 16, 18 is configured to enter a transactional execution mode when access to the shared data structure 24 is sought. Each processor core could for example recognise when a data item being accessed is one to which access is shared with another processor core by reference to information in a page table, by reference to a cache coherence protocol and tracking structures stored in the caches, or by reference to other known tracking and signalling structures. Alternatively or in addition, explicit "begin transactional execution mode" and "end transactional execution mode" instructions may be used to switch the processor in an out of transactional execution mode. Such a transactional execution mode is known to one of ordinary skill in the art, but in essence when operating in the transactional execution mode a processor core is constrained to access the memory 22 in a more conservative manner, according to which when access to the shared data structure 24 (or part thereof) is made, the processor core must first seek to acquire, and then successfully acquire, a lock on the data structure or data item, this lock being arranged that once acquired the processor to which it temporarily belongs has exclusive access to that data structure or data item until the lock is relinquished. This ensures that various types of known data hazard cannot then occur as a result of more than one processor simultaneously accessing the same data structure or data item, where different processing results for the data processing system 10 as a whole could arise as a result of the particular order in which the processors 16 and 18 access (and in particular modify) that shared data structure.

The present techniques described herein are particularly concerned with issues that have been identified in the context of a processor operating in its transactional execution mode and the manner in which that processor then maintains a call stack, this being a known data structure used by a data processing device to store return addresses (and possibly further associated processor state information) so that the processor can correctly navigate to the correct memory addresses (and update corresponding processor state information) as function calls and function returns are encountered in the sequence of data program instructions which it executes. One feature of the manner in which the processor cores 16 and 18 are constructed in order to implement the present techniques is that each is provided, within the set of internal registers 26 and 28 respectively with which it is provided, with an additional register in which a copy can be stored of the stack pointer (SP) which it uses to reference the call stack which it is maintaining. Further detail of when this stack pointer copy is stored to the dedicated register 30,32 provided for this purpose will be described below in more detail with reference to the following figures. Each data processing apparatus 12,14 is further provided with a level 1 (L1) cache 34 and 36 respectively. Each of these L1 caches is configured to cache a small subset of the content of the memory 22 for the use of its associated processor core, such that when the processor core seeks access to the content of the memory 22, the latency associated with accessing a data item stored in the memory 22 via the system bus 20 and possibly via the further members of the memory hierarchy (such as a level 2 (L2) cache—not illustrated) can largely be avoided. Each L1 cache 34, 36 is provided with a respective control unit 38, 40 which maintains overall control of the cache and in particular, in the illustrated embodiment, is configured in a manner which will be described in more detail with reference to the following figures to support the present techniques.

Figure 2A:
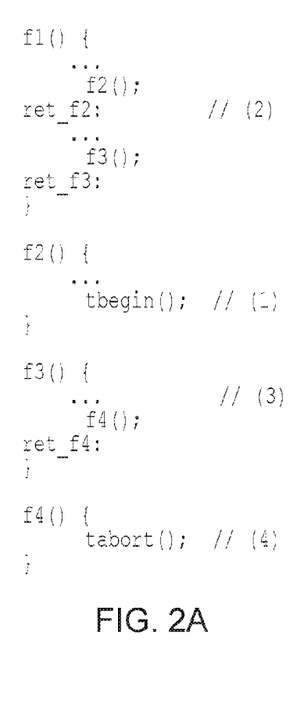
FIG. 2A shows an example sequence of C-like code.

FIG. 2A shows some C-like code illustrating the structure of a sequence of data processing instructions which may be executed by one of the processor cores 16, 18 in the data processing system 10 shown in FIG. 1. The code shown in FIG. 2A is a relatively simple set of function calls, in which some of the function calls are embedded within one another, for example the function f2( ) is embedded within the function f1( ), whilst the function f4( ) is embedded within the function f3( ), which itself is embedded within the function f1( ). Of particular significance to the present techniques is definition of the function f2( ) which includes the operation tbegin( ), at which point the processor executing these instructions will enter its transactional execution mode in order to seek access to a stored data structure or item in a memory. Note in particular therefore that the entering of the transactional execution mode, and the transactional operations which follow, are abstracted away within a library call.

In order to correctly proceed through the defined code shown in FIG. 2A the processor executing these instructions maintains a call stack onto which return addresses for the function calls it encounters in the sequence of program instructions are pushed, and thereafter are popped from when the function completes, so that the processor can correctly follow the programmed sequence of instructions as defined by the programmer.

Figure 2B:
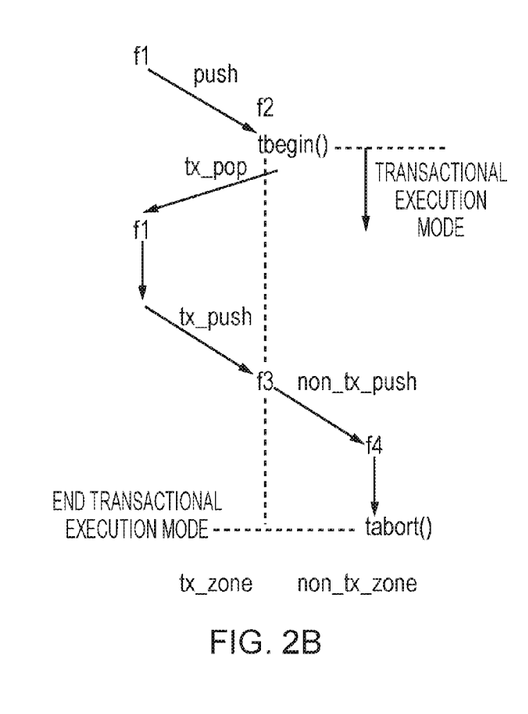
FIG. 2B schematically illustrates how the function calls and returns in the code of FIG. 2A correspond to pushes onto and pops from a call stack in one embodiment.

FIG. 2B provides an illustration of the pushes onto and the pops from the call stack when the processor executes the data processing instructions shown in FIG. 2A. Thus, when the processor encounters function f2( ) in function f1( ) a return address ret_f2 is pushed onto the call stack and at the end of function f2( ) this address (and possibly some more configuration data) is popped from the stack. Note that this pop at the end of function f2( ) is shown in FIG. 2B as tx_pop which refers to the fact that this pop occurs whilst the processor is in transactional execution mode, as will be explained in more detail below. Similarly when the processor encounters the function f3( ) later in the function f1( ) a return address ret_f3 is pushed onto the call stack (tx_push). However note that subsequent to this within the function f3( ), when the function f4( ) is encountered, a return address ret_f4 is also pushed onto the call stack, but this is labelled in FIG. 2B as non_tx_push since, as will be described in more detail below, the particular manner in which this return address ret_f4 is handled differs from the manner in which the return address ret_f3 is handled.

Figure 2C:
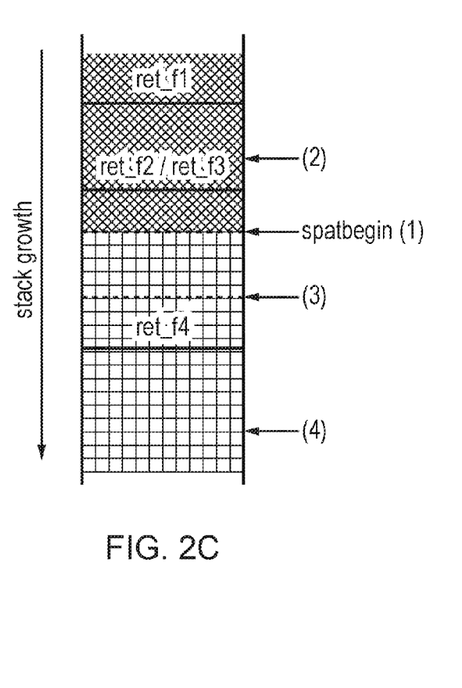
FIG. 2C schematically illustrates the content and growth of a call stack for the code of FIG. 2A in one embodiment.

FIG. 2C schematically illustrates the content and development of the call stack which the processor executing the instructions shown in FIG. 2A maintains as it proceeds through those instructions. As shown in FIG. 2C the call stack has a positive stack growth direction downwards on the page, although it should be noted that this should not be interpreted as a particular ordering of the memory addresses which the processor uses to maintain the call stack data structure—these could equally well proceed to increasing memory addresses or to decreasing memory addresses with positive stack growth, depending on the particular implementation. Of particular significance to the present discussion is the labelling (1) (2), (3) and (4) shown on the right of FIG. 2C and corresponding to particular points within the code as shown in FIG. 2A. These points indicate the stack depth which the call stack has at the point when that particular stage of the code is reached.

The processor maintains its knowledge of the current stack depth by means of a stack pointer (SP), for which a dedicated register is provided. In addition, the processor is configured to store a copy of the SP at the point at which it enters the transactional execution mode, i.e. in the illustrated example shown in FIGS. 2A and 2B when it encounters the tbegin( ) function. In the embodiment shown in FIG. 1, this copy of the stack pointer is stored into the dedicated register 30, 32 by the respective processor core 16, 18 which is executing the instructions shown in FIG. 2A. Thereafter, whilst the processor is still in its transactional execution mode, it references this stored copy of the stack pointer when it modifies the call stack and determines whether the modification to the call stack is in a positive stack growth direction with respect to the stack depth position indicated by that stored copy. Accordingly, referring to the illustration shown by FIG. 2C, modifications to the call stack at stack depth below the depth indicated by the depth indicated as SP@tbegin are determined to be in a positive stack growth direction with respect to the stored SP value, whilst modifications to the call stack at stack depth positions above this point are not in a positive stack growth direction. The processor executing the instructions shown in FIG. 2A is provided with an associated L1 cache, the control unit of which is configured to label a data item which forms part of the call stack data structure and is stored in the L1 cache as either non-speculative or speculative, in dependence on whether that modification to the call stack (whilst the processor is in its transactional execution mode) has taken place at a stack depth which is in a positive stack growth direction with respect to the stack pointer value SP@tbegin stored in the SP copy register. If the modification is made in a positive stack growth direction with respect to that SP copy value then the cache control unit labels the corresponding entry in the L1 cache as non-speculative, whilst if it is not in a positive stack growth direction with respect to that SP copy value then the corresponding data item is labelled as speculative.

This is illustrated in FIG. 2B by the vertical division of the Figure by the dashed line, dividing the portion of the Figure corresponding to the transactional execution mode of the processor into a "tx_zone" and a "non_tx_zone". Thus, modifications to the call stack which take place in the "tx_zone" are labelled as speculative, whilst modifications to the call stack in the "non_tx_zone" are labelled as non-speculative. This can be further understood with reference to the FIG. 2C, where it can be seen that the return address ret_f2 for the function f2( ) will in principle be overwritten by the return address ret_f3 for the function f3( ). However, the present techniques recognise that because the transactional execution which the processor seeks to carry out when operating in its transactional execution mode may not complete successfully, it may be necessary for the processor to roll back its execution state to that which it had when it encountered the tbegin( ) instruction, in order to attempt that transactional execution once more. Note that the transaction which the processor attempts whilst in its transactional execution mode might not successfully complete for a number of reasons, for example either being triggered dynamically, say because another processor is currently accessing the desired data item, or manually, e.g. due to the tabort( ) call shown in function f1( ) in FIG. 2A. If the modification of the call stack which involved the addition of the f3( ) return address ret_f3 had been allowed to definitively modify the corresponding entry in the L1 cache, then this modification would have been permanent, the corresponding data item might also have been evicted to memory in the interim, and the processor would have no way of rolling back the state of the call stack to the correct status for re-executing the tbegin( ) function in order to trigger the new attempt (in transactional execution mode) to carry out the required transaction. This is because the content of the call stack above the point SP@tbegin (1) in the illustration of FIG. 2C would then contain the return address for function f3( ), but not the return address for the function f2( ), since the latter would have been overwritten by the former. Accordingly, the processor would be unable to later return correctly from the function f2( ) since the required return address would no longer be available.

The present techniques address this issue by providing that the modifications to the call stack data structure which take place when the processor is in transactional execution mode are compared to the stored value SP@tbegin in order to determine whether they should be labelled as speculative or non-speculative. It should be appreciated however that this is not only a technique to ensure that the speculative nature of the modifications to the call stack in the "tx_zone", i.e. the hatched upper region shown in FIG. 2C, is correctly handled, but also relates to handling the call stack modifications in the non-tx-zone, i.e. the lightly shaded region shown in the lower portion of FIG. 2C. This latter aspect is of particular significance here, since it would be possible simply to cause all modifications to the call stack whilst the processor is in its transactional execution mode to be labelled as speculative (and indeed this is the approach taken in the prior art) since this would also ensure that in the event of a non-successful completion of the transactional execution mode, i.e when the attempted transaction does not successfully complete, the processor would also be able to correctly roll back to the required state at the point of the tbegin( ) call. However, although only a relatively simple set of data processing instructions are shown in the example of FIG. 2A, resulting in a relatively simple and limited evolution of the corresponding call stack shown in FIG. 2C, there is in principle no limit to the number of data processing instructions which could be carried out, and indeed further function calls made, whilst the processor is in its transactional execution mode. If all of these corresponding modifications to the call stack were simply to be labelled as speculative, then the administration of the call stack could become considerably burdensome, as copies of both the speculative (in transactional execution mode) and non-speculative (not in transactional execution mode) modifications to the call stack would have to be maintained, potentially resulting in a rather large write-set size associated with the transactional execution mode. This may be of significance in any data processing system where data storage capacity is finite, but may be of particular significance in an embodiment such as that illustrated in FIG. 1 in which in the first instance the call stack data structure is maintained by the processor within its associated L1 cache, where storage capacity is of course usually considerably more limited than that available in the main memory. Hence, according to the present techniques, despite the processor being in its transactional execution mode, some of the modifications to the call stack data structure which the processor circuitry maintains, are labelled as non-speculative. This has the consequence that these entries in the cache can safely get evicted to main memory, without affecting the ability of the processor to roll back its execution state correctly when an attempted transaction does not successfully complete. Moreover, whilst one processor core in the embodiments shown in FIG. 1 might be permitted to view the other processor core's call stack as represented by committed data items stored in the memory 22, if it is not allowed to view the speculative labelled content of the L1 cache associated with that processor core then correct atomicity of the transactions carried out within the data processing system 10 is maintained. Note that on successful completion of a transactional execution the entire call stack is configured to be labelled as non-speculative (non-transactional) and these cached data items can then be freely evicted to the memory 22. However, as mentioned above, in the event of an abort, either triggered dynamically or manually, e.g. due to the tabort( ) call in f4( ), all architectural state and memory that has been modified speculatively in the transaction (as far as it has proceeded) is rolled back to the state present at the call to tbegin( ) and in such a scenario any registers in the set of registers 26, 28 which point to the stack will roll back to their previous values and the stack pointer will be reset to the value of the snapshot taken at point (1) shown in FIGS. 2A and 2C.

Figure 3:
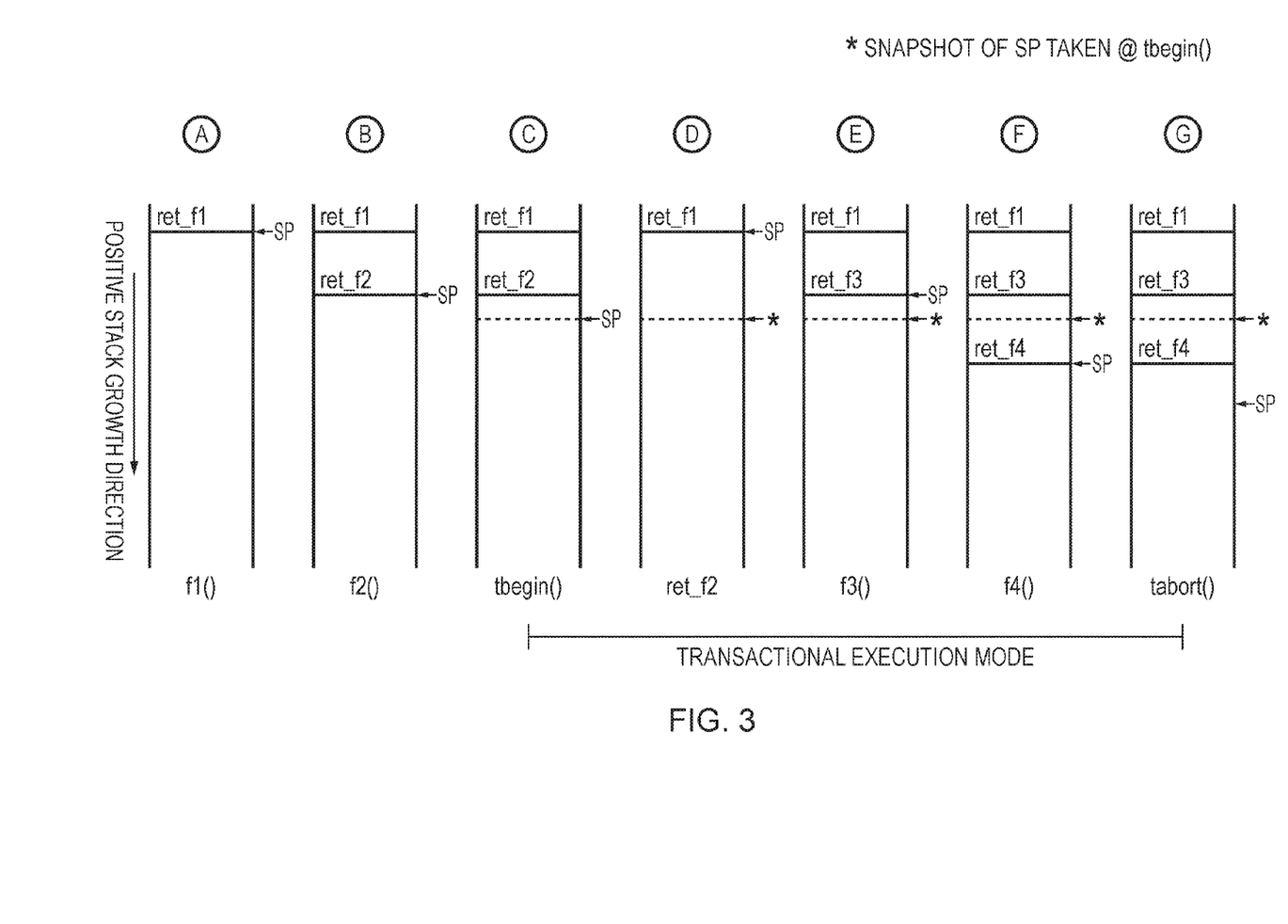
FIG. 3 schematically illustrates in more detail the evolution of the content of a call stack in one embodiment corresponding to execution of the code shown in FIG. 2A.

FIG. 3 shows a more explicit representation of the evolution of the call stack maintained by the processor circuitry which executes the sequence of data processing instructions shown in FIG. 2A. Stage A represents the call stack at the point at which the function f1( ) is encountered, where the stack pointer SP then indicates that the return address ret_f1 represents the current stack depth. Thereafter at stage B when the f2( ) function is encountered the return address ret_f2 is pushed onto the stack and the stack pointer indicates that the current stack depth corresponds to the position of this return address. When the tbegin( ) call is encountered at stage C note that the stack pointer has moved slightly in the positive stack growth direction due to some additional configuration information having been added to the call stack prior to the tbegin( ) instruction itself being encountered. This is then the stack depth (SP value) which the apparatus stores in its SP copy register (30 or 32) corresponding to entering the transactional execution mode. Thereafter the processor (predominately by delegation of this task to the control unit of its L1 cache) compares further modifications which it makes to the call stack against the value of the stack pointer stored in its SP copy register in order to determine whether these should be labelled as speculative or non speculative. Thus, at stage D in FIG. 3 when the ret_f2 instruction is encountered the popping of call stack content to return the current stack pointer to indicate the return address ret_f1 for function f1( ) is labelled as speculative. However, as will be discussed in more detail below with reference to FIGS. 4A-4C, it may not be necessary to label a pop modification to the call stack as speculative, since this only represents a speculative read for the processor, and as long as it is also ensured that another processor does not have access to the content of the cache which is associated with the processor core carrying out the illustrated instructions, then as long as this entry in the cache is only labelled as having being speculatively read (and not also speculatively written) then it can in fact be safely evicted to main memory without jeopardising the required transactional atomicity. A speculative write indeed takes place at stage E in FIG. 3 where the f3( ) function is encountered, since this takes place in a relative stacking position in the call stack which is not in a positive stack growth direction with respect to the stored SP snapshot taken at tbegin( ). Thus, the entry made in the cache which holds the return address ret_f3 is labelled as speculative. By contrast, at stage F, when the call to f4( ) is encountered, the modification required to push the f4( ) return address ret_f4 onto the call stack is identified as being in a positive stack growth direction with respect to the SP snapshot and accordingly the entry made in the cache holding this return address value is labelled as non-speculative. Thereafter, at stage G, when the tabort( ) call is encountered any speculative labelled content of the cache is discarded and only the non-speculatively labelled content is retained (i.e. in practice any speculatively labelled cache lines in the cache are marked as invalid) and the call stack data structure is thus reconstructed to its state at stage C when the tbegin( ) call was encountered, potentially from a combination of content which is stored in the L1 cache, and further into the memory hierarchy, such as from the main memory 22, to which some cache content may have been evicted in the interim.

Figure 4A:
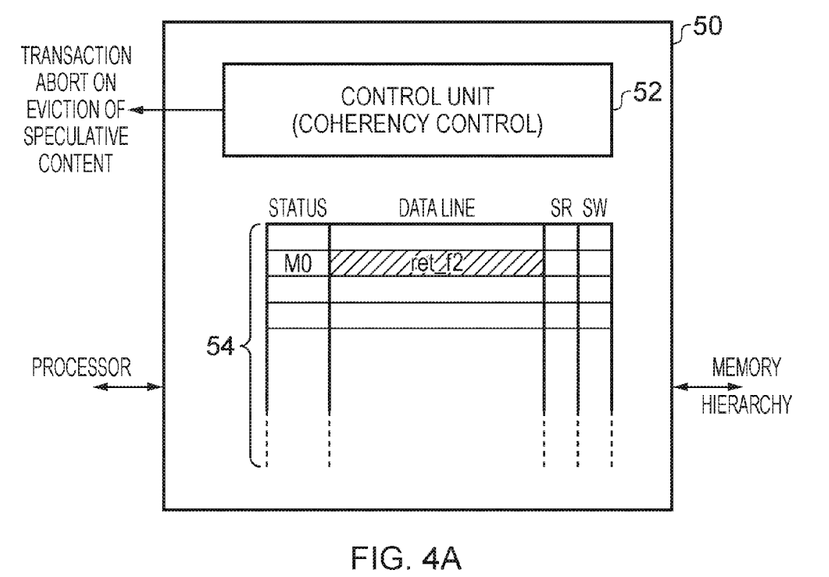
FIG. 4A schematically illustrates a storage unit in one embodiment.

FIG. 4 schematically illustrates a cache 50 in one embodiment, according to which either L1 cache 34 or 36 shown in FIG. 1 could be configured. The L1 cache 50 comprises a control unit 52 and a number of cache lines 54 in which the data may be stored. The control unit 52 maintains overall control of the cache 50 and administers updates to the cache lines 54. It furthermore maintains correct coherency control with respect to the remainder of the memory system found in the data processing system to which the cache 50 belongs. Hence, the cache 50 is positioned between a processor and the remainder of the memory hierarchy, this memory hierarchy potentially only comprising a main memory 22 such as that illustrated in FIG. 1, but may also comprise further cache levels. The cache lines 54 are shown with an example entry corresponding to the storage of the return address ret_f2 which has been labelled as "modified" (MO) in the content of this data line, indicating that this data has been modified by the processor and ultimately should be updated in the remainder of the memory hierarchy, in particular in the main memory 22 if this data line is evicted. Note that this data line for ret_f2 is not labelled as either having been speculatively read (SR) or speculatively written (SW) since this represents a modification to the call stack which has taken place before the processor entered its transactional execution mode.

Figure 4B:
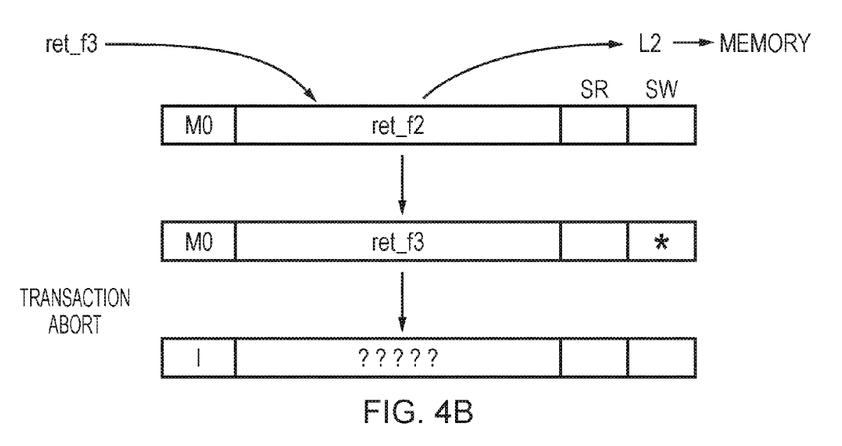
FIGS. 4B and 4C schematically illustrates an example usage of the storage unit of FIG. 4A.

FIG. 4B illustrates the subsequent evolution of the example cache line entry shown in FIG. 4A where, after having being populated by the return address ret_f2, the processor encounters the function call f3( ), and thus pushes the return address ret_f3 onto the call stack. As it happens, in this illustrated example, the memory addresses for the return addresses ret_f2 and ret_f3 are similar enough that they will both be stored by the cache 50 in the same cache line. Accordingly, when ret_f3 is pushed onto the call stack by the processor, the cache control unit 52 of the cache 50 causes this return address ret_f3 to evict the current content of the cache line (i.e. the return address ret_f2). Since this cache line, with the content ret_f2, is not labelled as having being speculatively written (SW), it may be evicted into the memory hierarchy, for example first into an L2 cache and potentially then further into the main memory 22. The return address ret_f3 then populates this cache line and is similarly marked with the "MO" status "modified", but is further labelled as having been speculatively written (SW) since the processor is now in transactional execution mode and this modification has not taken place in a positive stack growth direction with respect to the snapshot of the stack pointer SP taken at the point when processor encountered the tbegin( ) call. Thereafter, when the transaction aborts (by the processor encountering the instruction tabort( )) since this cache line is labelled as having been speculatively written, its content is invalidated (status "I").

Figure 4C:
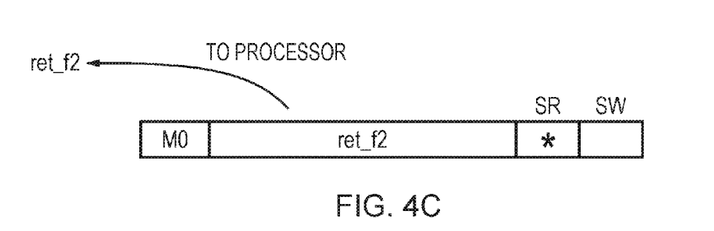

Compare the evolution of the cache line content shown in FIG. 4B to that shown in FIG. 4C, which illustrates the cache behaviour when stage D is reached in FIG. 3 where the return address ret_f2 for the function f2( ) is popped from the call stack and moreover this modification to the call stack does not take place in a positive stack growth direction with respect to the snapshot of SP at tbegin( ) and therefore (since the processor is in transactional execution mode) this is treated as a speculative modification. Hence, when the content of this cache line is returned to the processor, the cache line is then labelled as having being speculatively read (SR). As mentioned above however, this labelling of cache lines in the cache as speculatively read is in principle not required so long as the control unit 52 of the cache 50 ensures that any content (or at least any modified content) of the cache cannot be read by another processor in the data processing system. This may for example be enforced by a configuration in which the control unit 52, in enforcing the required system-wide memory coherency, simply responds to any enquiry received as part of the coherency protocol pertaining to this memory address by denying that such content currently exists in any valid state within the cache 50.

Figure 5:
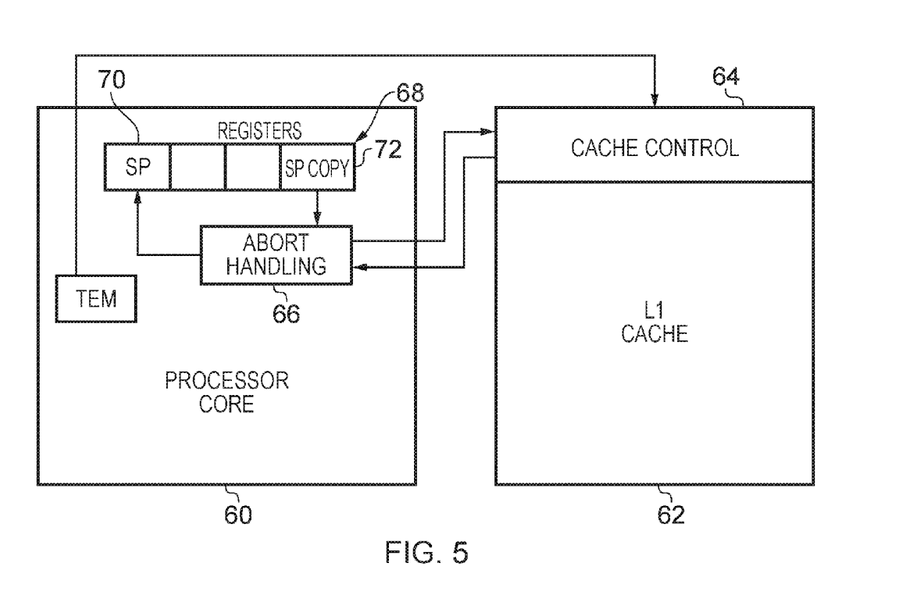
FIG. 5 schematically illustrates a processor core and associated L1 cache in one embodiment.

FIG. 5 schematically illustrates a processor core 60 and an L1 cache 62 showing a configuration according to which the corresponding components shown in FIG. 1 could be configured. The cache control 64 of the L1 cache 62 is configured to receive various information from the processor core 60 and to return some information to the processor core. In particular, the cache control 64 receives an indication from the processor core of the processing mode in which it is currently operating, such that the cache control 64 can appropriately administer the updating of content of the L1 cache 62 in dependence on whether the processor core is currently in its transactional execution mode (TEM) or not. This need not be a continuous signal but the processor core 60 can simply indicate to the cache control unit 64 when it changes execution mode. The processor core 60 is also provided with an abort handling unit 66 which is configured both to indicate a transaction abort to the cache controller 60 (for example when a tabort( ) call is encountered by the processor core, and to receive an abort indication from the cache control unit 64, for example when content of the L1 cache 62 which is marked as having been speculatively written (SW) is selected for eviction (on the basis of its corresponding memory address). This is a situation in which the attempted transaction should be aborted, because evicting this content to the remainder of the memory hierarchy could expose it to being read by another part of the data processing system and this could potentially jeopardise the atomicity of the attempted transaction. Alternatively, this issue might also be addressed by ensuring that the labelling of this cache entry as having been speculatively written is maintained when it is evicted to another part of the memory hierarchy, but this may incur additional configurational complexity which can be avoided by the relatively simple mechanism of aborting the transaction upon the attempted eviction of a cache entry marked as having been speculatively written. Whatever the cause of the transaction abort, the abort handling unit (which here is embodied as dedicated circuitry, although could be a dedicated abort handling routine programmed within the data processing instructions which the processor core 60 executes), then causes a roll back of the content of the registers 68 to their state at stage C in FIG. 3, i.e. when the tbegin( ) call was encountered. In particular in reference to the present techniques, this comprises the abort handling unit 66 replacing the content of the current stack pointer register 70 with the snapshot of the stack pointer taken when tbegin( ) was originally encountered and stored in the SP copy register 72.

Figure 6:
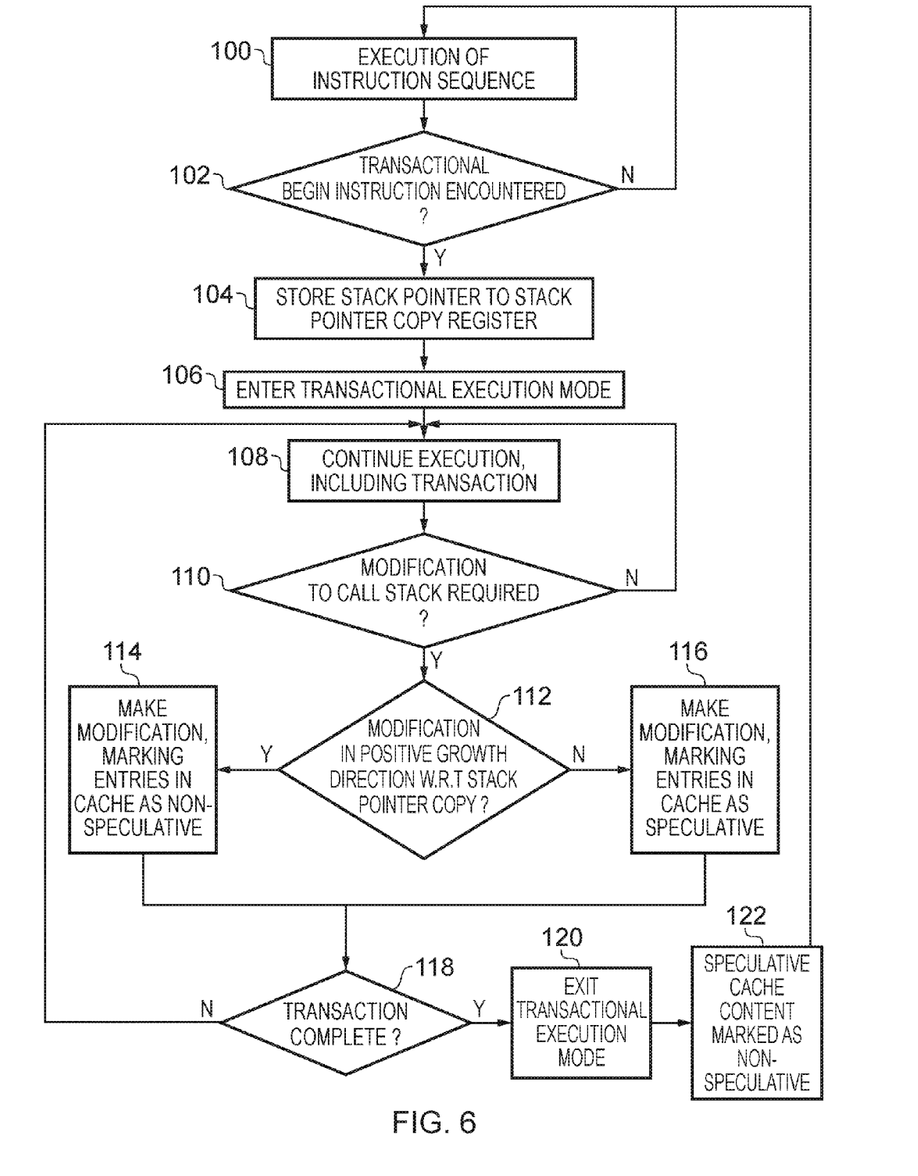
FIG. 6 schematically illustrates a sequence of steps which are taken according to the method of one embodiment.

FIG. 6 schematically illustrates a sequence of steps which are taken in the method of one embodiment. The flow can be considered to begin at step 100, where the processor is executing its instruction sequence. At step 102 it is determined if a transactional begin instruction (e.g. tbegin( )) is encountered. Whilst this is not the case then the flow simply loops back to step 100. Once such a transactional begin instruction is encountered then the flow proceeds to step 104, where the current value of the stack pointer is stored into a dedicated stack pointer copy register and thereafter at step 106 the processor enters its transactional execution mode. Following on to step 108 the processor continues its instruction sequence execution, including initiating the transactional access which it seeks to the shared data item or structure in memory. At step 110 it is determined if as part of continuing the sequence of data processing instructions modification to the call stack is required. If it is not then the flow simply loops back to step 108. However, when such modification is required then at step 112 it is determined if this modification to the call stack should take place in a positive growth direction with respect to the stack depth indicated by the stack pointer copy stored in the dedicated SP copy register. If this modification is in this positive growth direction then the flow proceeds to step 114 where the modification to the call stack data structure is made, marking any corresponding entry or entries in the cache as non-speculative. Alternatively, if the modification required to the call stack data structure is determined at step 112 not to be in a positive growth direction with respect to the stack depth indicated by the stack pointer copy then the flow proceeds to step 116, where the modification to the call stack data structure is made, and any corresponding entry or entries in the cache are marked as speculative. After either step 114 or step 116, the flow proceeds to step 118 where it is determined if the attempted transaction has successfully completed. Whilst it has not then the flow returns to step 108 for continued execution in the transactional execution mode to proceed. However, once the attempted transaction is successfully completed then the flow proceeds to step 120, where the processor exits its transactional execution mode and at step 112 any speculatively labelled cache content is updated to be marked as non-speculative. The flow then returns to step 100.

Figure 7:
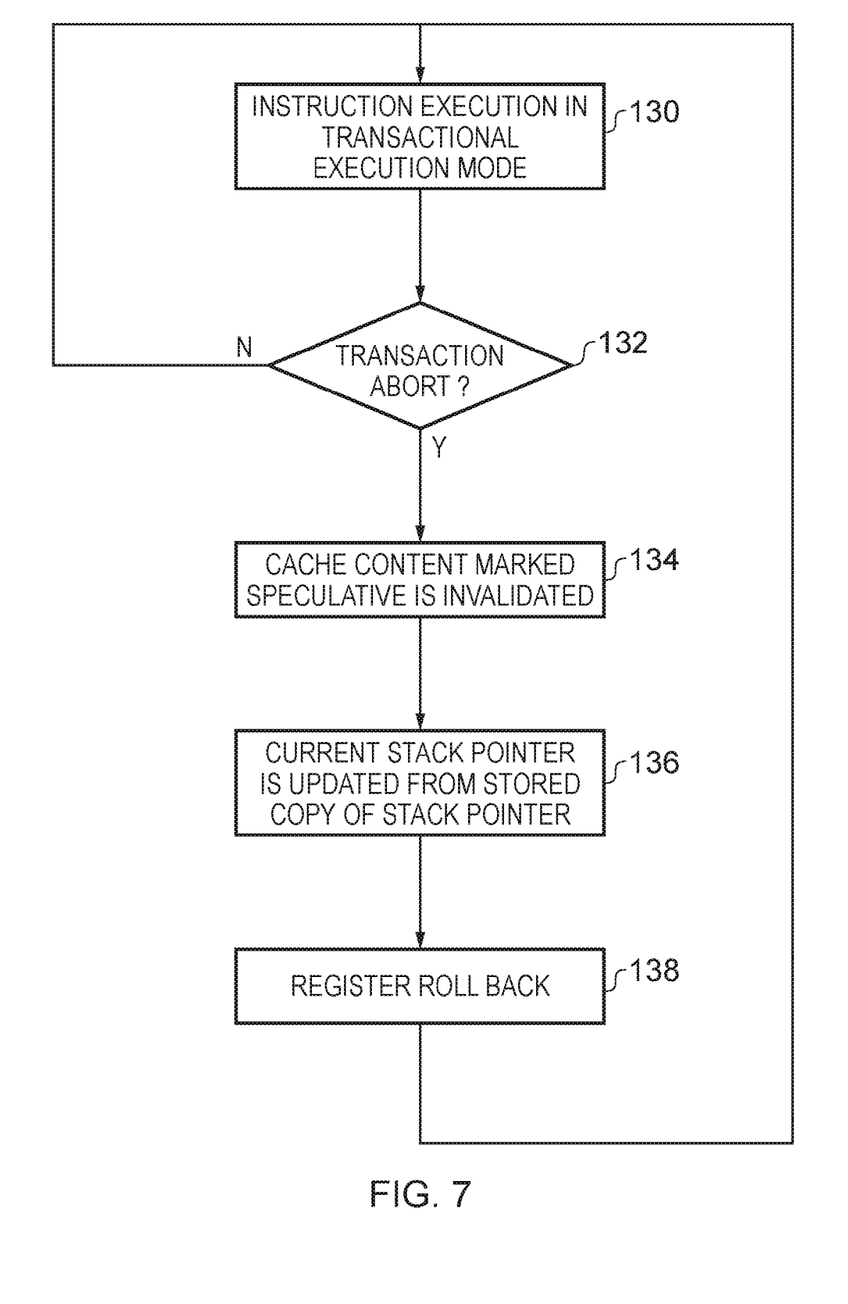
FIG. 7 schematically illustrates a sequence of steps which are taken in one embodiment in order to monitor for and react to a transaction abort.

It will be noted that the sequence of steps illustrated in FIG. 6 do not include steps taken when an attempted transaction is aborted, and such steps are illustrated in FIG. 7, where these steps can be considered to be running in parallel to those illustrated in FIG. 6, whilst the processor is in its transactional execution mode. The execution of instructions by the processor in its transactional execution mode is represented by step 130. At step 132 it is continually checked if a transaction abort has occurred. Whilst it has not the flow simply loops back to the step 130. However, when a transaction does abort then the flow proceeds to step 134 where any cache contact marked as speculative is invalidated. Further, at step 136, the current stack pointer is updated from (i.e. rolled back to) the stored copy of the stacked pointer taken at the point when the processor entered its transactional execution mode and at step 138 any other content of the registers (other than the current stack pointer register) which is required to revert the state of the processor to that which it had when it entered its transactional execution mode is also restored. The flow then returns to step 130 for the processor to remain in transactional execution mode and attempt the transaction once more.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. Apparatus comprising:
   processor circuitry configured to execute data processing instructions, wherein the processor circuitry is configured to maintain a call stack data structure in dependence on the data processing instructions it executes, and wherein the processor circuitry is configured to operate in a transactional execution mode when the data processing instructions executed access stored data items shared with further processor circuitry; and
   pre-transactional stack pointer storage circuitry configured to store a stack depth indication for the call stack data structure, wherein the processor circuitry is configured to store the stack depth indication prior to entering the transactional execution mode,
   wherein the processor circuitry is configured, when operating in the transactional execution mode, to determine a relative stacking position for a modification to the call stack data structure with respect to the stack depth indication, and
   if the relative stacking position is in a positive stack growth direction with respect to a position indicated by the stack depth indication, to store in association with the modification an indication that the modification is non-speculative, and
   if the relative stacking position not in a positive stack growth direction with respect to the position indicated by the stack depth indication, to store in association with the modification an indication that the modification is speculative.

2. The apparatus as claimed in claim 1, wherein the pre-transactional stack pointer storage circuitry is configured to store a copy of a stack pointer used by the processing circuitry for the call stack data structure.

3. The apparatus as claimed in claim 1, wherein the pre-transactional stack pointer storage circuitry comprises a register accessible to the processing circuitry.

4. The apparatus as claimed in claim 3, wherein the register is configured to be inaccessible to data processing instructions executed by the processing circuitry.

5. The apparatus as claimed in claim 1, wherein if the relative stacking position is not in the positive stack growth direction with respect to the position indicated by the stack depth indication, and the modification is a push to the call stack data structure, a data item pushed onto the call stack data structure by the push is marked as speculatively written.

6. The apparatus as claimed in claim 1, wherein if the relative stacking position is not in a positive stack growth direction with respect to the position indicated by the stack depth indication, and the modification is a pop from the call stack data structure, a data item popped from the call stack data structure by the pop is marked as speculatively read.

7. The apparatus as claimed in claim 1, further comprising storage circuitry configured to store local copies of data items accessed by the processor circuitry in memory when executing the data processing instructions, wherein the processor circuitry is configured to maintain the call stack data structure in the storage circuitry.

8. The apparatus as claimed in claim 7, wherein the storage circuitry comprises a coherency control unit, the coherency control unit configured to allow content of the storage circuitry indicated as non-speculative to be evicted to the memory and to generate an error condition if content of the storage circuitry is selected for eviction and is indicated as speculative.

9. The apparatus as claimed in claim 8, wherein the coherency control unit is configured, when the processing circuitry exits the transactional execution mode and the data processing instructions executed in the transaction execution mode have successfully completed their data processing operations, to change content of the storage circuitry indicated as speculative to indicated as non-speculative.

10. The apparatus as claimed in claim 7, wherein the coherency control unit is configured to hide content of the storage circuitry indicated as speculative from the further processor circuitry.

11. The apparatus as claimed in claim 1, further comprising abort handling circuitry, the abort handling circuitry configured, when the processing circuitry is operating in the transactional execution mode, to perform a rollback procedure in response to an indication that a pending transaction has failed,
wherein the rollback procedure comprises discarding any modifications indicated as speculative and resetting a current stack pointer using the stored stack depth indication.

12. Apparatus comprising:
means for executing data processing instructions;
means for maintaining a call stack data structure in dependence on the data processing instructions executed, wherein the means for executing data processing instructions is configured to operate in a transactional execution mode when the data processing instructions executed access stored data items shared with further means for executing data processing instructions;
means for storing a stack depth indication for the call stack data structure, wherein the stack depth indication is stored prior to the means for executing data processing instructions entering the transactional execution mode;
means for determining, when operating in the transactional execution mode, a relative stacking position for a modification to the call stack data structure with respect to the stack depth indication; and
means for storing an indication in association with the modification, wherein if the relative stacking position is in a positive stack growth direction with respect to a position indicated by the stack depth indication, the indication shows that the modification is non-speculative, and
if the relative stacking position is not in a positive stack growth direction with respect to the position indicated by the stack depth indication the indication shows that the modification is speculative.

13. A method of data processing in a processor device comprising:
executing data processing instructions;
maintaining a call stack data structure in dependence on the data processing instructions executed;
entering a transactional execution mode when the data processing instructions executed will seek access to stored data items shared with a further processor device;
storing a stack depth indication, wherein the stack depth indication is stored prior to entering the transactional execution mode;
determining, when operating in the transactional execution mode, a relative stacking position for a modification to the call stack data structure with respect to the stack depth indicator; and
if the relative stacking position is in a positive stack growth direction with respect a position indicated by the stack depth indication, storing in association with the modification an indication that the modification is non-speculative, and
if the relative stacking position is not in a positive stack growth direction with respect to the position indicated by the stack depth indication, storing in association with the modification an indication that the modification is speculative.

* * * * *